United States Patent

Tranquilla et al.

[11] Patent Number: 5,972,302
[45] Date of Patent: Oct. 26, 1999

[54] METHOD FOR THE MICROWAVE INDUCED OXIDATION OF PYRITIC ORES WITHOUT THE PRODUCTION OF SULPHUR DIOXIDE

[75] Inventors: James M. Tranquilla, New Brunswick, Canada; Paul R. Kruesi, Golden, Colo.

[73] Assignee: EMR Microwave Technology Corporation, New Brunswick, Canada

[21] Appl. No.: 09/008,327

[22] Filed: Jan. 16, 1998

Related U.S. Application Data

[63] Continuation-in-part of application No. 08/703,703, Aug. 27, 1996, abandoned.

[51] Int. Cl.$^6$ ............................. C01G 49/06; C01B 17/06
[52] U.S. Cl. ......................... 423/148; 423/153; 423/154; 423/571; 34/259; 34/265
[58] Field of Search .................... 34/259, 265; 422/186; 423/138, 148, 153, 154, 571

[56] References Cited

U.S. PATENT DOCUMENTS

| | | | |
|---|---|---|---|
| 1,870,479 | 8/1932 | Bacon et al. | 423/577 |
| 1,939,033 | 12/1933 | Bacon et al. | 423/577 |
| 2,044,960 | 6/1936 | Tyrer | 423/153 |
| 2,750,275 | 6/1956 | Parker | 423/571 |
| 2,772,153 | 11/1956 | West | 423/148 |
| 2,872,294 | 2/1959 | Eads | 23/224 |
| 3,528,179 | 9/1970 | Smith | 34/1 |
| 3,632,312 | 1/1972 | Jukkola | 23/177 |
| 4,126,945 | 11/1978 | Manser | 34/4 |
| 4,476,098 | 10/1984 | Nakamori | 422/140 |
| 4,511,362 | 4/1985 | Ravindram | 44/1 |
| 4,967,486 | 11/1990 | Doelling | 34/1 |
| 5,051,456 | 9/1991 | Bernier | 523/300 |
| 5,114,700 | 5/1992 | Meihack et al. | 423/571 |
| 5,376,162 | 12/1994 | Cavanagh | 75/749 |
| 5,382,412 | 1/1995 | Kim | 422/142 |

FOREIGN PATENT DOCUMENTS

| | | | |
|---|---|---|---|
| 9674 | 10/1932 | Australia | 423/153 |
| 217268 | 11/1956 | Australia | 423/148 |
| 482962 | 5/1952 | Canada | 423/148 |
| 525481 | 5/1956 | Canada | 423/577 |
| 549181 | 11/1957 | Canada | 423/577 |
| 1066214 | 10/1958 | Germany | 423/153 |
| 1045663 | 12/1958 | Germany | 423/153 |
| 59-4431 | 1/1984 | Japan | 422/168 |

*Primary Examiner*—Gary P. Straub
*Assistant Examiner*—Timothy C Vanoy
*Attorney, Agent, or Firm*—Morgan, Lewis & Bockius LLP

[57] ABSTRACT

Pyritic ores are heated with microwave energy in a fluidized bed to a temperature in the range of approximately 573 degrees Kelvin to 823 degrees Kelvin with a controlled amount of oxygen to promote the oxidation of the pyritic ores according to the reaction: $2FeS_2 + 3/2\ O_2 \rightarrow Fe_2O_3 + 4S$, thereby preventing the production of sulphur dioxide.

6 Claims, 3 Drawing Sheets

METHOD FOR THE MICROWAVE INDUCED OXIDATION OF PYRITIC ORES WITHOUT THE PRODUCTION OF SULPHUR DIOXIDE

REFERENCE TO RELATED CASES

This application is a continuation-in-part of U.S. patent application Ser. No. 08/703,703 filed Aug. 27, 1996 now abandoned, entitled "Method and Apparatus for Oxidation of Sulphidic Ores and Ore Concentrates Without the Production of Sulphur Dioxide Gas" by the same inventors herein.

FIELD OF INVENTION

This invention relates to a microwave fluidized bed reactor which is used to oxidize pyritic ores by controlling microwave power density, oxygen concentration and fluidizing gas flow in such a way as to prevent oxidation of the sulphur into gaseous sulphur dioxide.

BACKGROUND OF THE INVENTION

Many commercially important metals occur naturally in chemical composition with sulphur and iron, including gold and copper. These sulphidic compounds are difficult to process to a state where the important metals can be recovered.

Methods for separating metals from their sulphidic host minerals fall into two categories: Pyrometallurgical recovery and hydrometallurgical recovery. Pyrometallurgical recovery involves heating the ore mass and in the process decomposing the sulphide through oxidation resulting in the formation of sulphur dioxide gas. Hydrometallurgical recovery on the other hand involves the dissolution of the ore constituents in a liquid medium in which one or more chemical reactions can be initiated which will cause the important metals to form a new, recoverable compound. Pyrometallurgical recovery is unsatisfactory today because of the formation of sulphur dioxide gas in the so-called roaster oxidation reaction. Accordingly, this technique has largely been abandoned due to legislation restricting sulphur dioxide emissions. Hydrometallurgical recovery is also an unsatisfactory process because metal recovery is hindered and, in many cases, rendered practically useless in the presence of sulphidic compounds.

Recent developments in this area include bio-oxidation where bacterial enzymes are used to oxidize sulphidic ores. However, this process is highly sensitive to variables such as temperature, sulphur concentration, and the presence of other minerals that may be toxic to the bacteria. Furthermore, the process is extremely expensive and relatively slow, rendering it commercially unviable in many situations.

Conventional pyrite roaster reactions are described by $$FeS_2 \rightarrow FeS+S \qquad (I)$$

$$4FeS+7O_2 \rightarrow 2Fe_2O_3+4SO_2 \qquad (II)$$

$$S+O_2 \rightarrow SO_2 \qquad (III)$$

In reaction (I), pyrite ($FeS_2$) is decomposed into pyrrhotite (FeS) and elemental sulphur (S). In the presence of oxygen and at sufficiently high temperature the associated reactions (II) and (III) include the oxidation of pyrrhotite to form hematite and sulphur dioxide, and of sulphur to form sulphur dioxide. These reactions are highly exothermic, hence it is not possible in conventional roasting reactors to prevent the temperature from increasing to the point where $SO_2$ is produced. In fact, in conventional roaster operation, this exothermic energy is necessary to provide the reaction energy needed to cause (I) to occur. This reaction, when augmented by steam and oxygen, may be used as a means of producing high quality $SO_2$ as a desired product, as disclosed by Jukkola in U.S. Pat. No. 3,632,312.

An alternative reaction to reactions (I)–(III) is:

$$2FeS_2+1.5O_2 \rightarrow Fe_2O_3+4S \qquad (IV)$$

by which pyrite is oxidized directly into hematite and elemental sulphur. Table 1 and FIG. 4 present a thermodynamic analysis of this reaction at various temperatures. Tryer, for example, teaches this reaction (IV) in Australian Patent No. 9674. However, Tryer states in his disclosure that it is necessary to maintain the operating temperature within the range 800° C.–1000° C. (1073–1273° K) to promote the combination of a high concentration of $SO_2$ with ferrous sulphide to produce sulphur, a process which often requires the introduction of additional $SO_2$ to make up the necessary concentration.

An associated reaction, the combination of sulphur with hematite to form magnetite ($Fe_3O_4$) and $SO_2$ is described by:

$$3Fe_2O_3+S \rightarrow 2Fe_3O_4+0.5SO_2 \qquad (V)$$

Table 2 and FIG. 3 present a thermodynamic analysis of this reaction at various temperatures. Referring to Table 2 and FIG. 3 it will be seen that reaction (V) only begins to become significantly favoured over reaction (IV) for temperatures above approximately 800° K (527° C.).

Thus, because of the continuum of reactions, in order for reaction (IV) to be favored and to avoid the entire roaster reaction (I–III) at lower temperatures, the operating temperature must be maintained below approximately 1000° K (727° C.) and, furthermore, in order to avoid the predominance of reaction (V), the temperature must be maintained below approximately 800° K (527° C.). In view of the fact that pyrite reacts in the presence of abundant oxygen according to the reaction described by:

$$2FeS_2+5.5O_2 \rightarrow Fe_2O_3+4SO_2 \qquad (VI)$$

(shown as the lowermost curve in FIG. 4 from the data in Table 3) and this is the most strongly favoured pyrite reaction, it is also important to restrict the supply of oxygen so that reaction (IV) remains as the favoured reaction to allow for the production of elemental sulphur (central curve of FIG. 4) as opposed to $SO_2$.

Therefore, to limit $SO_2$ production, the preferred operating temperature is below 800° K (527° C.), where the reaction products of pyrite and oxygen will be primarily restricted to hematite and sulphur as described in reaction (IV).

The ability to maintain the otherwise highly exothermic oxidation reaction temperature below 800° K (527° C.) requires separate control of: (1) the oxygen supplied to the reaction; (2) the power (energy) introduced into the material; and (3) the gas flow through the reaction environment (coolant). Control of the aforesaid factors can be achieved, in association with the present invention, using a fluidized bed reactor with power supplied by microwave energy, for treating pyritic mineral ore.

Fluidized bed reactors are presently widely used in many ore processing applications where strong interaction between a solid product and gas medium is required and the use of microwave energy to provide some or all of the required reaction energy has been disclosed in, for example, U.S. Pat. Nos. 3,528,179; 4,126,945; 4,967,486; 4,511,362; 4,476,098; 5,382,412 and 5,051,456.

The use of a fluidized bed reactor with a microwave source of power provides the ability to control the oxygen supply to the material undergoing treatment (which governs the rate of reaction and hence reaction temperature) independently of the microwave power (which supplies the energy to initiate the chemical reaction and compensates for other energy losses). The use of microwave energy also provided the unique ability to selectively heat certain materials in the presence of less absorptive gangue materials as is the case with pyritic ores.

The exhaust stream from the reactor is depleted of oxygen as a consequence of the oxidation reaction with the fluidized bed and consists principally of nitrogen. It has been found that by diverting and preferably cooling the exhaust stream and reintroducing it into the reactor with the fluidizing stream that it is effective as a coolant and thus provides the final factor required to achieve the preferred chemical reaction to process pyrite minerals under temperature conditions that provide reaction products that are free of $SO_2$ emissions.

SUMMARY OF THE INVENTION

Thus the invention comprises a method of oxidizing pyritic ores using a reaction vessel. The method comprises the steps of: (a) fluidizing a bed of pyritic ore in said reactor using a fluidizing gas; (b) heating said bed of ore with microwave energy to initiate an exothermic oxidation reaction in the bed; and (c) cooling the temperature of the reaction in said bed to a temperature at which the preferred reaction products are hematite and elemental sulphur.

The invention also comprises a method of oxidizing pyritic ores using a fluidizing bed reactor. The method comprises the steps of: (a) heating a bed of pyritic ore with microwave energy to initiate an exothermic oxidation reaction within the bed; (b) controlling the inflow of oxygen to the reaction in the reaction chamber; and (c) cooling the temperature of the reaction in said bed to a temperature at which the reaction products are hematite and elemental sulphur, while continuing to supply said bed with microwave energy to selectively heat the pyrite in the presence of magnetite and hematite.

The invention still further comprises a method for the oxidization of pyritic ores, without the production of $SO_2$ as a by product, using a fluidized bed reactor powered by microwave energy. The method comprises the steps of: (a) isolating the vent gases from the reactor when in operation; (b) cooling the said vent gases; and (c) re-introducing the vent gases into the fluidization gases in the reactor to cool the internal reaction temperature.

BRIEF DESCRIPTION OF THE DRAWINGS

The following is a description by way of example of a preferred embodiment of the present invention, reference being made to the accompanying drawings in which.

While the invention will be described in conjunction with the illustrated embodiment, it will be understood that it is not intended to limit the invention to such embodiment. On the contrary, it is intended to cover all alternatives, modifications and equivalents as may be included within the spirit and scope of the invention as defined by the appended claims.

DETAILED DESCRIPTION OF THE PREFERRED EMBODIMENTS

Figure 1:
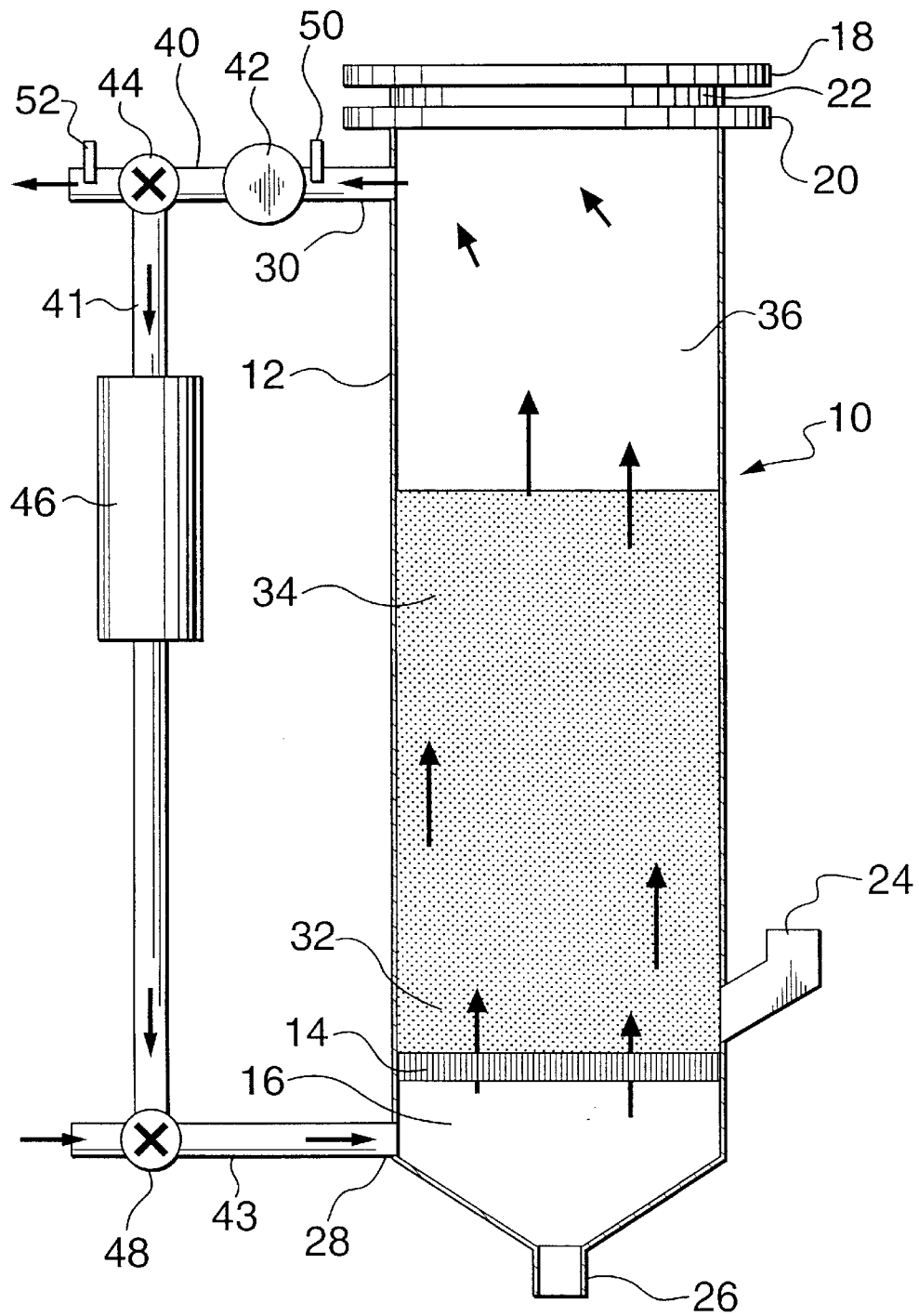
FIG. 1 is a cross sectional view of a fluidized bed reactor of the present invention.

In the drawings, similar features have been given similar reference numerals. As illustrated in FIG. 1 a reactor vessel, such as a fluidized bed reactor 10, comprises a tubular waveguide resonator reaction chamber or cavity 12, bed fluidizer screen 14, and a pressure chamber 16. The reaction chamber 12 is connected to a microwave energy source via waveguide fittings 18 and 20 which may include a coupling iris (not shown) as well as a pressurized gas seal 22. The reaction chamber 12 has a material inlet valve 24, material exit valve 26, gas inlet valve 28 and a gas exhaust port 30. Exhaust port 30 is connected to pipe 40 which is in turn connected to particulate separator 42 (which may be a cyclonic separator), and a first control valve 44. Control valve 44 is connected by pipe 41 to heat exchanger 46 and second control valve 48, which is connected by pipe 43 to the gas inlet valve 28. Pipe 40 has a gas exit port temperature monitor 50 and an $SO_2$ sensor 52.

Solid material to be processed, usually pyritic ore, is introduced through the inlet valve and is to be fluidized by gas 32 which is supplied from an external source through pipe 43 to control valve 48 and the gas inlet valve 28. The introduction of gas will cause the material which has been introduced through the inlet valve to form a fluidized bed 34 which is suspended through the adjustment of the gas pressure in the pressure chamber 16 and the bed fluidizer screen 14. The fluidized bed is then ready for treatment with microwave energy which is introduced into the reaction chamber from the top via the waveguide fittings. When the bed is in a fluidized state, the solid material is heated by the dielectric and resistive effects caused by interaction between the electromagnetic field and the solid material constituents.

The fluidizing gas will be continuously pumped through valve 28 and exhausted through port 30 during the treatment process. The exhaust stream will be passed through particulate separator 42 to clean the gas of particulate matter (either fines blown free from the fluidized bed or sulphur powder produced from the reaction). The stream will then pass through control valve 44 by which some or all of the exhaust stream, which will be depleted of $O_2$ and consist primarily of $N_2$, can be recirculated back to the chamber after being passed through heat exchanger 46 and second control valve 48. Second control valve 48 allows the exhaust gas to be mixed with fresh air, or gases (if required), to provide the fluidizing stream and act as a coolant for the reaction chamber to achieve the preferred chemical reaction to process pyrite minerals under temperature conditions that provide reaction products that are free of $SO_2$ emissions.

The region 36 above the suspended fluidized bed 34 is generally essentially free of solid material and consists primarily of fluidized gas and gaseous reaction products. The gas seal 22 permits the transmission of microwave energy into the reaction chamber 12 while isolating the atmosphere and contents of the chamber from the connecting waveguide attached via fittings 18 and 20.

Treatment of a pyritic ore, according to the present invention, will now be described in greater detail.

Figure 2:
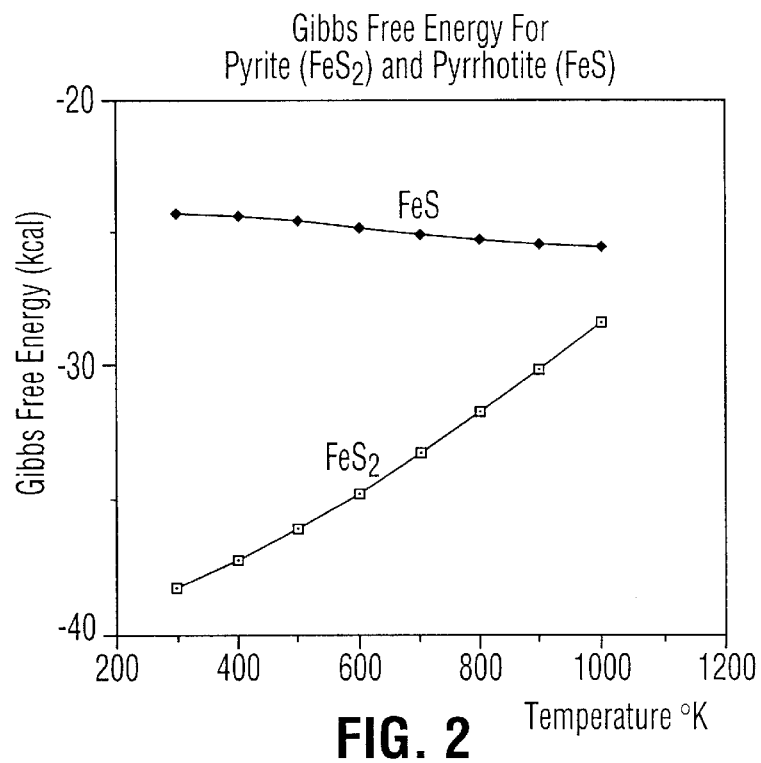
FIG. 2 is a graph showing thermodynamic stability data of Table 1.

The pyritic ore is loaded into the reaction chamber 12 through valve 24. The ore is then fluidized into the bed 34 by pumping a fluidizing gas, which is generally just air, through valve 28. Next microwave energy is applied, via the waveguide fitting. The microwave energy raises the fluidized bed to the preferred operating temperature in the range of about 573° K–823° K, where as can be seen from the data of Table 1 and shown in FIG. 2, pyrite is preferred over pyrrhotite. Once the temperature of the bed has been raised to about 573° K the sulphur-hematite reaction, reaction (IV), commences.

Figure 3:
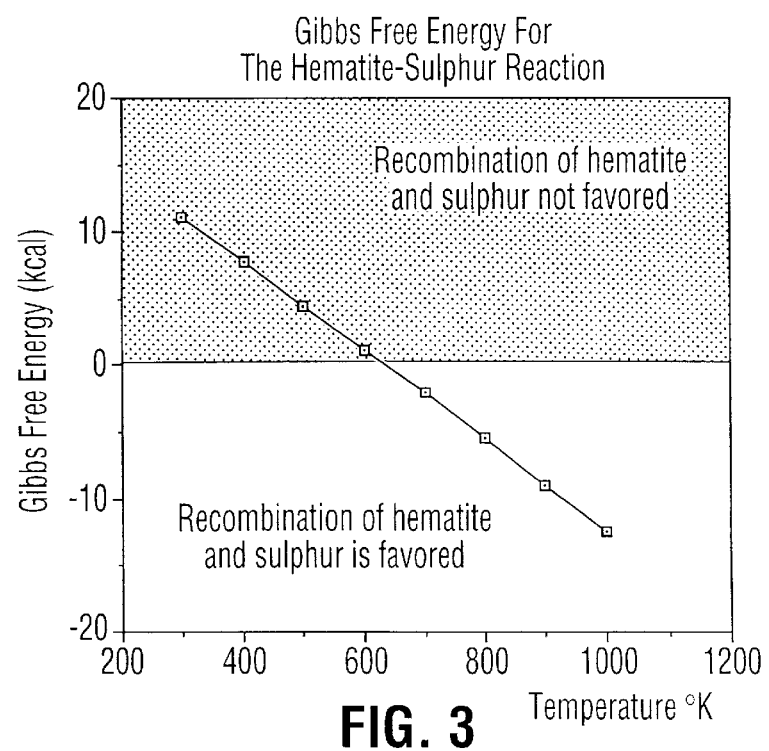
FIG. 3 is a graph showing thermodynamic stability data of Table 2.
Figure 4:
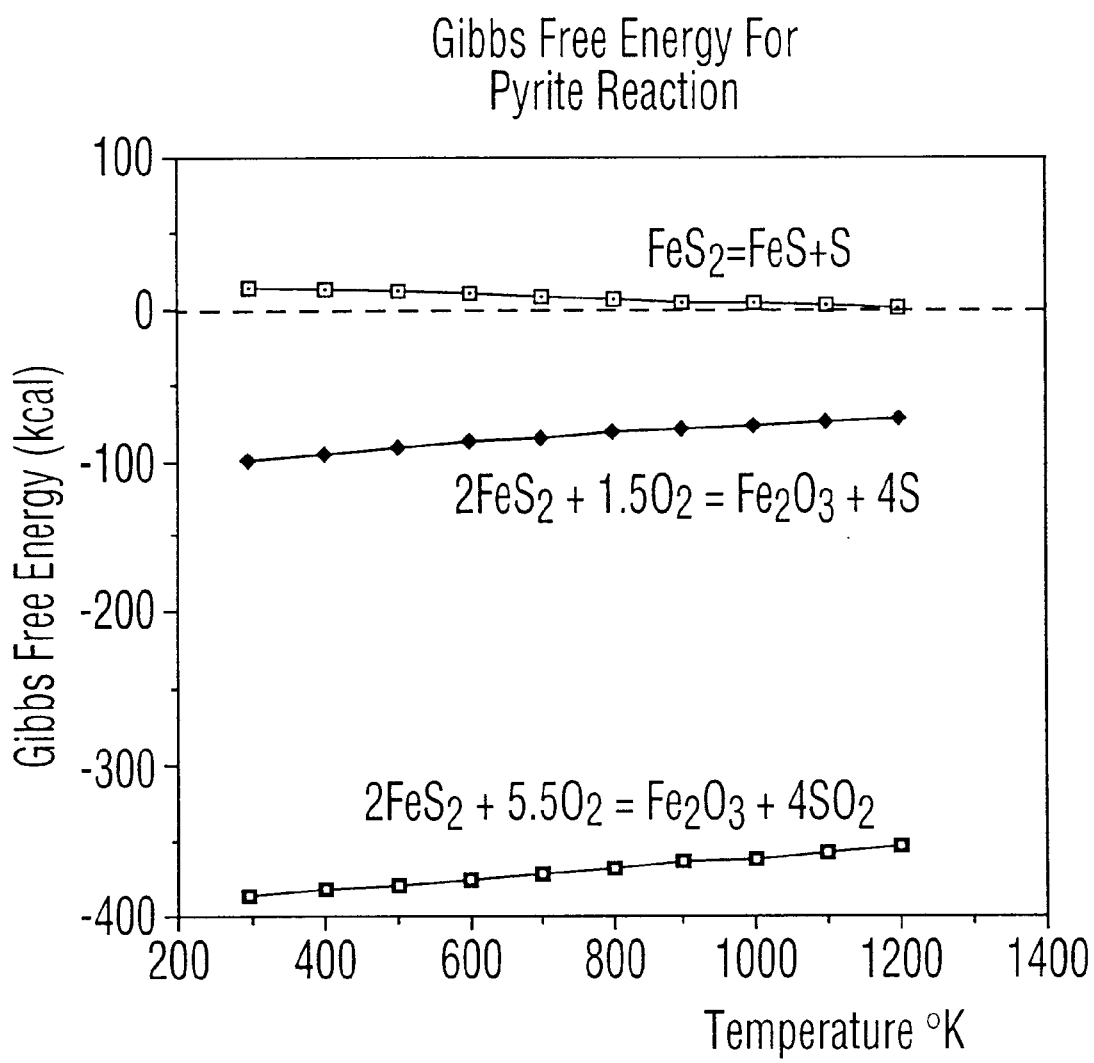
FIG. 4 is a graph showing the Gibbs Free Energy for various pyrite reactions from data of Table 3.

In reference to Table 2 and reaction (V) described therein, as the occurrence of this reaction must be minimized in favour of reaction (IV), it is necessary to maintain a positive Gibbs free energy state (shown graphically in FIG. 3 as the region above the zero Gibbs free energy value which ocurs at approximately 625° K). The standard thermodynamic data for reaction (V) presumes that the elemental sulphur produced by reactions (I) and (IV) remains in the reactor and is therefore available for combination with hematite ($Fe_2O_3$) to initiate reaction (V). However, if the elemental sulphur is removed from the reactor as soon as it is formed from the pyrite ($FeS_2$) decomposition according to reaction (IV), it is possible to operate the reactor at a temperature which would otherwise normally have a negative Gibbs free energy, yet maintain the predominance of reaction (IV) over reaction (V) because reaction (V) is starved of S. This is an important advantage provided by the use of a fluidized bed reactor since the continuous flow of fluidizing gas provides a ready means for removal out of the reactor of the liberated sulphur fume (fine dust which has formed after separation from the pyrite) by blowing it out. It is, however, preferable to maintain the sulphur, when present, above it boiling point temperature of 718° K (at the molecular level) so as to prevent it from crystalizing or condensing within the reactor environment. It is important to note that while the gross reactor temperature may not have reached 718° K, this temperature can be reached within the ore at the molecular level, such that operation of the reactor at, say 573° K, is feasible. As both the cool incoming fluidizing gas and the reactor walls tend to moderate the temperature, an operating temperature somewhat above the zero Gibbs free energy point may be specified. In practice, it has been determined that an upper limit of 823° K is appropriate. Although this temperature is in fact in the negative Gibbs free energy region, the rate of change with temperature from the predominance of reaction (IV) over reaction (V) is relatively small about the zero region and, accordingly, reaction (V) is not strongly favoured over reaction (IV).

In view of the foregoing, satisfactory results can be achieved by operating the reactor in a broad range of temperatures from about 573° K to 823° K, which includes the lower limit from just below the zero Gibbs free energy point to the upper limit where sulphur is maintained well above its boiling point. If during heating the temperature of the bed rises too quickly (i.e. the $N_2$ in the vent gasses is not yet sufficient to restrict the amount of $O_2$ and thus cool the reaction), $N_2$ can be introduced into the fluidizing stream via valve 48. The reaction can be monitored by checking the particulate separator 42, which will reveal the presence of sulphur, an indicator of the reaction, or by a temperature spike from temperature probe 50 since the initial pyrite reaction is exothermic.

In view of the fact that pyrite reaction is extremely exothermic, the temperature of the reaction chamber will continue to rise (in conventional reactors the running temperature is usually between 873° K and 1023° K), causing the release of $SO_2$; unless the reaction is cooled to favour reaction (IV).

First of all, the reaction can be cooled by reducing the input of microwave energy; although, as will be discussed below, it is preferable to maintain at least some input of microwave energy, in the range of 0.5 kw. The second control of the reaction temperature is through the manipulation of the recirculating gases which, due to the reaction in the chamber, has been reduced to primarily $N_2$. If the reaction has not sufficiently reduced the $O_2$ from the circulating gases, additional inert gasses can be introduced into the stream to control the amount Of $O_2$ in the reactor. Additionally, the recirculating gases themselves can be cooled prior to reintroduction into the reaction chamber.

Pyrite can be selectively heated while in the presence of magnetite and hematite since it absorbs microwave energy more efficiently. Accordingly, it may be treated by the continued application of microwave energy during the exothermic reaction which is ongoing in the reaction chamber while at the same time the mass of the bed is being cooled by the recirculating gas stream.

Once the treatment process has been completed and the fluidized material appropriately heated or processed, it is ejected from the reactor through port 30 by increasing the fluidizing gas pressure. Any material which has fallen through screen 14 during loading and processing of the chamber is removed through valve 26.

Although described as preferably being tubular, the reaction chamber 12 can be of any appropriate dimension or geometry as dictated by the microwave field distribution. Additionally, while being described as an iris coupled resonator, the reaction chamber may operate as a terminated waveguide (iris fully open) in which case the absorptive action of the load material gives the reactor the characteristics of a travelling-wave applicator.

While the invention has been described in conjunction with a specific embodiment thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

TABLE 1

Gibbs Free Energies (kcal) with increasing temperature for the Pyrite Oxidation Reaction

| Temp ° K. | ° C. | FeS2 | FeS | 2FeS2 | + 1.5 O2 = | Fe2O3 | + 4S | Sum |
|---|---|---|---|---|---|---|---|---|
| 298 | 25 | −38.26 | −24.37 | −76.52 | | −177.42 | | −100.9 |
| 400 | 127 | −37.28 | −24.43 | −74.55 | | −170.78 | | −96.23 |
| 500 | 227 | −36.06 | −24.61 | −72.12 | | −164.37 | | −92.25 |
| 600 | 327 | −34.7 | −24.83 | −69.4 | | −158.09 | | −88.69 |
| 700 | 427 | −33.22 | −25.07 | −66.44 | | −151.91 | | −85.47 |
| 800 | 527 | −31.66 | −25.27 | −63.32 | | −145.83 | | −82.51 |
| 900 | 627 | −30.01 | −25.44 | −60.03 | | −139.84 | | −79.81 |
| 1000 | 727 | −28.25 | −25.53 | −56.51 | | −133.91 | | −77.41 |

TABLE 2

Gibbs Free Energies (kcal) with increasing temperature for the Sulphur - Hematite Reaction

| Temp °K. | Temp °C. | $3Fe_2O_3 + S =$ | $2Fe_3O_4 +$ | $0.5 SO_2$ | Sum |
|---|---|---|---|---|---|
| 298 | 25 | −532.27 | −485.32 | −35.83 | 11.12 |
| 400 | 127 | −512.33 | −468.64 | −35.97 | 7.72 |
| 500 | 227 | −493.12 | −452.71 | −35.99 | 4.42 |
| 600 | 327 | −474.26 | −437.14 | −35.95 | 1.2 |
| 700 | 427 | −455.73 | −421.92 | −35.88 | −2.08 |
| 800 | 527 | −437.5 | −407.12 | −35.78 | −5.41 |
| 900 | 627 | −419.52 | −392.77 | −35.66 | −8.91 |
| 1000 | 727 | −401.74 | −378.55 | −35.51 | −12.32 |

TABLE 3

Gibbs Free Energies (kcal) with increasing temperature for pyrite reactions

| Temp °K. | Temp °C. | $FeS_2 = FeS + S$ | $2FeS_2 + 1.5 O_2 = Fe_2O_3 + 4S$ | $2FeS_2 + 5.5 O_2 = Fe_2O_3 + 4SO_2$ |
|---|---|---|---|---|
| 298 | 25 | 13.89 | −100.9 | −387.73 |
| 400 | 127 | 12.85 | −96.23 | −383.98 |
| 500 | 227 | 11.46 | −92.25 | −380.16 |
| 600 | 327 | 9.87 | −88.69 | −376.32 |
| 700 | 427 | 8.16 | −85.46 | −372.52 |
| 800 | 527 | 6.39 | −82.51 | −368.77 |
| 900 | 627 | 4.58 | −79.81 | −365.11 |
| 1000 | 727 | 2.72 | −77.41 | −361.52 |
| 1100 | 827 | 0.81 | −75.32 | −357.98 |
| 1200 | 927 | −1.2 | −73.62 | −354.46 |

What we claim as our invention:

1. A method of oxidizing pyritic ores in a fluidized bed, said method comprising the steps of:

(a) heating a bed of pyritic ore in the fluidized bed to a temperature in the range of about 573° K to 823° K using microwave energy to initiate a controlled, sub-autogenous exothermic oxidation of pyritic ore into hematite and elemental sulphur within the bed;

(b) controlling the inflow of oxygen to the fluidized bed to about stoichiometric quantities for the reaction: $2FeS_2 + 3/2O_2 \rightarrow Fe_2O_3 + 4S$; and (c) maintaining the temperature of the fluidized bed within the range of about 573° K to 823° K to produce the hematite and elemental sulphur.

2. A method according to claim 1 wherein the maintaining step comprises: removing a portion of the fluidizing gas from the reaction chamber, cooling said portion of the fluidizing gas via heat exchange; and recirculating the cooled portion of the fluidizing gas back into the reaction chamber.

3. A method according to claim 2 wherein the $N_2$ or another inert gas is introduced into the recirculated fluidizing gas.

4. A method according to claim 1 wherein the maintaining step comprises reducing the microwave energy that is supplied to the bed.

5. A method according to claim 2 further comprising the step of monitoring the temperature of the outgoing fluidizing gases.

6. A method according to claim 2 further comprising the step of monitoring the sulphur content of the outgoing fluidizing gases.

* * * * *